3,174,960
PROCESS FOR POLYMERIZATION OF CERTAIN CONJUGATED DIENES IN AQUEOUS MEDIA

William A. Hewett, Oakland, Calif., assignor to Shell Oil Company, New York, N.Y., a corporation of Delaware
No Drawing. Filed Apr. 30, 1962, Ser. No. 191,290
6 Claims. (Cl. 260—94.3)

This invention relates to the polymerization of certain conjugated dienes. More particularly, it relates to the polymerization of conjugated dienes containing at least a minimum proportion of butadiene.

Conjugated dienes and other vinyl monomers may be polymerized to produce stereospecific addition products. Such polymerization can be conducted in contact with catalysts that are referred to in the art as "Ziegler" or "low-pressure" catalysts. Another class of catalysts being used for producing stereospecific polymers are the lithium based catalysts. Representative of the Ziegler catalysts are the reaction products of (1) a transition metal halide wherein the metal is selected from groups IV–VIB and VIII of the Periodic Table and (2) an organo metallic reducing agent wherein the metal is selected from groups I–III of the Periodic Table. For example, a Ziegler catalyst is represented by the reaction product of titanium trichloride and aluminum diethyl chloride.

The lithium based catalysts are represented for example by lithium butyl or a mixture of lithium butyl and lithium metal. These well-known catalysts are always employed in the presence of inert hydrocarbon solvents wherein the polymerization system is essentially free of water, oxygen and other polar contaminants.

Certain disadvantages chiefly concerned with the concentration limitation are imposed on the solvent system used with such catalysts. For example, the presence of more than only a few percent of polymer in hydrocarbon solution produces a cement which is so high in viscosity as to be substantially impractical for commercial treatment. Secondly, the use of solvent systems requires that the solvent be removed. While the large bulk of the solvent can be removed easily, it is extremely difficult in practice to remove the last few percent of solvent, thus causing later difficulties in utilization and quality of the resulting products.

The avoidance of solvent polymerization systems has been found possible, if not commercially practicable, by the use of aqueous systems employing certain water-soluble catalysts, preferably, salts of metals from groups VII and VIII of the Periodic Table of elements. While a high degree of control over the stereospecificity of the system is thus possible by the proper selection of the metallic salt so employed, the rate and extent of polymerization has been far from satisfactory. The systems heretofore employed showed either an extremely slow rate of polymerization or a relatively low degree of polymerization usually accompanied by an unsuitable low average molecular weight of the resulting product.

It is an object of the present invention to provide an improved process for the stereospecific polymerization of certain conjugated dienes. It is a further object of the invention to provide an improved process for the polymerization of conjugated dienes, specifically butadiene in aqueous medium. It is a particular object of the invention to provide an improved process for the production of a high cis content polybutadiene in aqueous emulsion at a substantially improved rate and extent of polymerization. Other objects will become apparent during the following detailed description of the invention.

Now, in accordance with the present invention, it has been found possible to polymerize conjugated dienes which include at least 5 mol percent of butadiene with a high degree of stereoregularity and at a substantially improved rate in aqueous environments which are oxygen free by utilizing as the catalyst in the system a critically defined and limited combination of cobaltous fluoride and alkali metal fluoride or zinc fluoride. The use of this particular combined catalyst results in an unpredictably accelerated rate of reaction, a high cis or trans content of the product, a high level of conversion, and a satisfactory average molecular weight of the polymeric product. Still in accordance with the invention, optimum results are obtained by the use of an aqueous medium having a pH between about 6.5 and about 7.7. Still in accordance with the invention, the most satisfactory results are obtained by the use of catalysts wherein the mol ratio of cobaltous fluoride to alkali metal fluoride is between about 1:0.75 and about 1:1.5, maximum rates and other advantageous features being obtained when equimolar amounts of cobaltous fluoride and alkali metal fluoride are present.

It appears to be essential that the aqueous media employed in the polymerization mixture be essentially free of dissolved oxygen. By "essentially free" it is meant that the media contain less than about 1000 (preferably 250) parts per million of dissolved oxygen. Oxygen may be removed in any manner, and is most simply accomplished by boiling the water to be used for the aqueous medium at atmospheric pressure. Additionally, it is advantageous for purposes of quality control to pass the water through a column packed with ion exchange resins to deionize the water, but this depends largely on the character of the water that is available.

The polymerization may be conducted at temperatures ranging from $-10°$ C. to about $100°$ C. In the prior art techniques for producing stereospecific elastomers, the variations in polymerization temperature produced products of varying molecular weights.

Elevated pressures may be employed with advantage, particularly if the elevated pressures are obtained by increasing the partial pressure of the monomer. In general, the process is conducted at about autogenic pressure but pressures as high as about 35 atmospheres may be employed.

The catalyst used in the process of the invention is extremely specific both with regard to its components and the ratio of components. Cobaltous fluoride (either anhydrous or hydrated) is present in the polymerization system in critical ratios with alkali metal fluoride. The mixture of catalyst components may be added separately to the aqueous phase or may be mixed prior to use in the polymerization system. The catalyst may be introduced into the polymerization zone at any time during polymer formation or prior thereto or, alternatively may be introduced at specified intervals during the polymerization period.

With the catalyst combination $CoF_2 \cdot NaF$, a high cis content is obtained, the product apparently predominating in polymer molecules which are substantially entirely of cis structure. Crystallization half time at $-16°$ C. is 80–92 minutes, indicating the stereospecificity of the subject catalyst system and a cis content of over 96%, if the polymer had random structure. When the catalyst combinations employed comprise $CoF_2 \cdot KF$ or $CoF_2 \cdot LiF$, the products predominate in trans 1,4 product. In both types of reactions, the presence of the alkali metal fluoride unaccountably increases the rate of polymerization by a factor of about 5–20.

The quantity of combined catalyst varies between about 0.05% and about 2% by weight based on the conjugated dienes, said dienes comprising at least 5% by weight of butadiene. Preferably, the proportion of catalyst is between about 0.25% and 1% by weight.

The process of the invention may be employed to polymerize the conjugated dienes comprising at least 5% by weight of butadiene and preferably at least about 25% by weight of butadiene. Optimum results are obtained with the use of unmodified butadiene as the sole conjugated diene being polymerized. The advantages relative to rate and extent of reaction are not realized with conjugated dienes in the absence of at least 5% butadiene even though the system is one which contains the critical combination of cobaltous fluoride and alkali metal fluoride as described herein before. Thus, isoprene, chloroprene and other conjugated dienes, particularly those having up to 8 carbon atoms may be combined with butadiene in carrying out the process of this invention.

The present process must be conducted in the presence of particular classes of emulsifying agents, namely, alkali metal alkaryl sulfonates and sulfates. The presence of emulsifying agents is required to increase the rate of polymerization as shown in the examples which follow. With emulsifying agents, the polymerization is mechanically analogous to the emulsion or suspension polymerization processes known in the art. However, the present invention differs sharply from the prior emulsification polymerization processes in that the catalyst is not dependent upon hydroperoxides, persulfates or other free radical initiators. Because the free radical catalysts produce entirely different polymers, usually having no stereoregularity and therefore having less desirable properties, those catalysts must be absent in the present process.

The mechanism that causes stereospecific polymerization according to the present invention at the relatively high rate of reaction is unique and not fully understood. The polymerization of conjugated dienes in the presence of an emulsifying agent permits the rapid formation of synthetic elastomers which may be recovered from the emulsion in the form of the latex or optionally, latices can be prepared without going through a separate emulsification and subsequent stripping step.

The alkali metal (preferably sodium) salts of $C_{10-18}$ alkyl benzene sulfonic acids are preferred and are employed in the order of 0.1–5%, preferably 2–4% based on the weight of the aqueous phase.

The products obtained by the process of this invention range from high molecular weight solids to lower molecular weight materials (usually 200–500,000) depending on the set of operating conditions employed within the framework of the conditions outlined hereinbefore. The instant processes are dependent in part upon the pH of the system which generally should be maintained within the range from about 6.5–7.7, preferably between about 6.8 and 7.6.

In conducting the polymerization according to the present invention, the several reactants and diluents are brought together by any conventional means and in any preferred order. Because of sensitivity of the polymerization to dissolved oxygen, care should be taken to avoid contamination from this source. Accordingly, a preferred procedure is to conduct the polymerization in the same vessel employed for removing dissolved oxygen or, alternatively, to move the treated water to the polymerization reactor without allowing it to come in contact with atmospheric oxygen.

The polymer prepared according to the process of the present invention may be utilized for any of the known industrial applications of synthetic rubber, such as in tires, belts, tubes, and the like. Of course, it may be modified by the presence of the usual rubber compounding ingredients and vulcanizing agents as well as associated materials such as anti-oxidants etc. The polymers may be combined with waxes, asphalts, tars and the like to form surfacing compositions for roads and walkways.

The present invention will be described in greater detail in the following examples:

EXAMPLE I

In order to determine the rate of reaction as measured by polymer yield within a given length of time, and the degree of stereoregularity of the product, comparative polymerizations were conducted with butadiene as the monomer, the catalyst being cobalt fluoride (Sample A) or combinations of cobalt fluoride with varying mol ratios of sodium fluoride as shown in Table I.

According to the table, it will be seen that the polymer yield and percent of cis-1,4 content of the product are highly sensitive to the mol ratio of cobalt fluoride to sodium fluoride. These comparative polymerizations were conducted in sealed ampules containing ten parts by weight of water, 0.3 part by weight of sodium alkyl benzene sulfonate and 5.5 parts by weight of butadiene for 5 days at 50° C. It will be noted according to Table I that the only satisfactory result obtained was when using a 1:1 mol ratio of cobalt fluoride to sodium fluoride. Higher ratios of the sodium fluoride gave negligible yields during the polymerization time employed which were of the same order as those obtained with the unpromoted catalyst (Sample A), although the cis 1,4 content was indeed somewhat higher.

Table I
EFFECT OF RATIO $CoF_2/NaF$

| Sample | Mol Ratio, $CoF_2/NaF$ | Polymer Yield | Percent cis-1,4 |
|---|---|---|---|
| A | 1/0 | 8 | 11 |
| B | 1/1 | 55 | 60 |
| C | 1/2 | 13 | 34 |
| D | 1/5 | 3 | 25 |
| E | 1/10 | 5 | 28 |

EXAMPLE II

The effect of the type of emulsifier employed in the systems under consideration was studied, the results of which are given in Table II below. The same reaction conditions were employed as described in Table I, a cobalt fluoride to sodium fluoride ratio of 1:1 and 0.3 part by weight of emulsifier being utilized. It will be seen according to Table II that in the absence of any emulsifier no polymerization occurred. When emulsifiers of a nonionic type were utilized, only about 3% of polymer was formed during the standard reaction time of 5 days. Cationic emulsifiers illustrated by Sample J gave a high yield of polymer but this appeared to be of a free-radical distribution type. Anionic emulsifiers were tested, the only satisfactory ones being those of alkali metal alkyl benzene sulfonates and sulfates, the best one being Sample H wherein sodium dodecyl benzene sulfonate was utilized.

Table II
EFFECT OF EMULSIFIER

| Sample | Emulsifier | Emulsifier Type | Polymer Yield | Percent cis 1,4 |
|---|---|---|---|---|
| F | None | | 0 | |
| G | Sodium mixed alkyl benzene sulfonates. | Anionic | 36 | 62 |
| H | Sodium dodecyl benzene sulfonate. | do | 42 | 81 |
| I | Sodium hexyl sulfosuccinate. | do | 1 | 49 |
| J | Dodecyl trimethyl ammonium chloride. | Cationic | 73 | 25 |

EXAMPLE III

The effect of pH upon the type of polymerization was studied as shown by the results obtained and reported in Table III below. It will be seen that relatively high pH's in the order of 7.8 favored trans-1,4 formation while the control sample (Sample L) having a pH of 7.6 showed an extremely high cis 1,4 content and a reasonably high polymer yield. The conditions employed included polymerization in sealed ampules of a reaction mixture comprising 0.4 mm. cobalt fluoride, 0.4 mm. sodium fluoride, 10 mm. water, 0.3 gram of sodium dodecyl benzene sulfonate and 5.5 mm. butadiene for 5 days at 50° C.

Table III also shows that acid pH's cause reduced rates of reaction as measured by polymer yield and result in higher trans 1,4 content of the product. The operable pH range for the stereospecific reaction according to the present invention appears to be between about 6.5 and 7.7.

Table III

EFFECT OF pH

| Sample | pH | Polymer Yield, percent | Percent cis 1,4 | Percent trans 1,4 |
|---|---|---|---|---|
| K | 7.8 (NaOH,H$_3$BO$_3$) | 56 | 13 | 62 |
| L | 7.6 (Control) | 46 | 81 | 14 |
| M | 3.4 (H$_2$SO$_4$) | 41 | 26 | 55 |
| N | 2.0 (H$_2$SO$_4$) | 3 | 32 | 49 |

EXAMPLE IV

An investigation of a variety of various fluorides to be used for supplementing cobalt fluoride in the subject class of polymerization is reported in Table IV below. It will be seen according to this table that the combination of cobalt fluoride with sodium fluoride was the sole combination in which polymer yield coupled with a high cis 1,4 content was obtained. When lithium or potassium fluoride were substituted for sodium fluoride, the yield of polymer was even higher but the product had a high trans 1,4 content. Alkaline earth metal fluorides (Samples S and T) were of no interest due to the low yield of product obtained by their use. The same was true of ammonium fluoride and mercury fluoride. Zinc fluoride gave not only a high yield but also a high 1,4 content.

Table IV

| Sample | Catalyst Composition | Polymer Yield, percent | Percent cis 1,4 | Percent trans 1,4 |
|---|---|---|---|---|
| O | 1:1 CoF$_2$,NaF | 44 | 77 | 17 |
| P | 1:1 CoF$_2$,LiF | 64 | 11 | 67 |
| Q | 1:1 CoF$_2$,KF·2H$_2$O | 76 | 17 | 65 |
| R | 1:1 CoF$_2$,NH$_4$F | 8 | 21 | 60 |
| S | 1:0.5 CoF$_2$,MgF$_2$ | 10 | 13 | 63 |
| T | 1:0.5 CoF$_2$,CaF$_2$ | 1.9 | 10 | 65 |
| U | 1:0.5 CoF$_2$,HgF$_2$ | 0 | | |
| V | 1:0.5 CoF$_2$,ZnF$_2$ | 86 | 37 | 42 |

I claim as my invention:

1. The process comprising polymerizing diene hydrocarbons having up to 8 carbon atoms per molecule, at least 25% by weight of said hydrocarbons being butadiene in contact with a catalyst consisting essentially of cobaltous fluoride and sodium fluoride, said fluorides being present in a mol ratio between about 1:0.75 and about 1:1.5 the polymerization being conducted in an essentially oxygen-free aqueous medium in the presence of an alkali metal alkaryl sulfonate at a pH between about 6.5 and 7.7.

2. The process comprising polymerizing butadiene in contact with a catalyst consisting essentially of cobaltous fluoride and sodium fluoride said fluorides being present in a mol ratio between about 1:0.75 and about 1:1.5, the polymerization being conducted in an essentially oxygen-free aqueous medium in the presence of a sodium C$_{10-18}$ alkyl benzene sulfonate emulsifying agent at a pH between about 6.8 and 7.6.

3. The process according to claim 1 wherein the mol ratio of cobaltous fluoride to sodium fluoride is 1:1.

4. The process comprising polymerizing butadiene in an essentially oxygen-free aqueous medium and in the presence of a catalyst consisting essentially of an essentially equimolar mixture of cobaltous fluoride and sodium fluoride at a pH of 6.8 and 7.7, said aqueous medium containing 2–4% by weight of an alkali metal salt of an alkaryl sulfonic acid, the weight ratio of butadiene to catalyst being between about 1:50 and about 1:500.

5. The process comprising polymerizing hydrocarbons having a terminal vinyl group, at least 25% by weight of said hydrocarbons being butadiene in contact with a catalyst consisting essentially of cobaltous fluoride and an alkali metal fluoride, said fluorides being present in a mol ratio between about 1:0.75 and about 1:1.5, the polymerization being conducted in an essentially oxygen-free aqueous medium in the presence of an alkali metal alkaryl sulfonate at a pH between about 6.5 and 7.7.

6. The process comprising polymerizing diene hydrocarbons having up to 8 carbon atoms per molecule, at least 5% by weight of said hydrocarbons being butadiene in contact with a catalyst consisting essentially of cobaltous fluoride and a fluoride of the group consisting of alkali metal fluorides and zinc fluoride, said fluorides being present in a mol ratio between about 1:0.75 and about 1:1.5, the polymerization being conducted in an essentially oxygen-free aqueous medium in the presence of an emulsifying agent comprising alkali metal alkaryl sulfonates at a pH between about 6.5 and 7.7.

No references cited.

JOSEPH L. SCHOFER, *Primary Examiner.*